(12) United States Patent
Hawkins et al.

(10) Patent No.: US 11,951,423 B2
(45) Date of Patent: Apr. 9, 2024

(54) SYSTEMS AND METHODS FOR SCREENING

(71) Applicant: Process Wastewater Technologies, LLC, Rosedale, MD (US)

(72) Inventors: Robert A. Hawkins, Louisville, KY (US); Edwin R. Hunt, Joppa, MD (US)

(73) Assignee: Process Wastewater Technologies, LLC, Rosedale, MD (US)

( * ) Notice: Subject to any disclaimer, the term of this patent is extended or adjusted under 35 U.S.C. 154(b) by 0 days.

(21) Appl. No.: 17/397,034

(22) Filed: Aug. 9, 2021

(65) Prior Publication Data
US 2022/0040603 A1 Feb. 10, 2022

Related U.S. Application Data

(60) Provisional application No. 63/063,201, filed on Aug. 7, 2020.

(51) Int. Cl.
| | |
|---|---|
| *B01D 29/64* | (2006.01) |
| *B01D 21/00* | (2006.01) |
| *B01D 21/24* | (2006.01) |
| *B01D 21/34* | (2006.01) |
| *B01D 29/35* | (2006.01) |

(Continued)

(52) U.S. Cl.
CPC ..... *B01D 29/6453* (2013.01); *B01D 21/0012* (2013.01); *B01D 21/2433* (2013.01); *B01D 21/245* (2013.01); *B01D 21/34* (2013.01); *B01D 29/35* (2013.01); *B01D 29/60* (2013.01); *B01D 29/6446* (2013.01); *B01D 29/682* (2013.01); *B01D 29/684* (2013.01); *B01D 39/12* (2013.01); *B01D 2239/10* (2013.01)

(58) Field of Classification Search
CPC ............ B01D 29/6438; B01D 29/6446; B01D 29/6453; B01D 29/6461; B01D 29/68; B01D 29/682; B01D 29/684; B01D 29/686; B01D 29/688
See application file for complete search history.

(56) References Cited

U.S. PATENT DOCUMENTS

| | | |
|---|---|---|
| 3,221,886 A | 12/1965 | Lamort |
| 4,130,478 A | 12/1978 | Swallow |
| | (Continued) | |

FOREIGN PATENT DOCUMENTS

| | | |
|---|---|---|
| CN | 102580387 A | 7/2012 |
| EP | 1064977 A1 | 1/2001 |

OTHER PUBLICATIONS

International Search Report and Written Opinion Issued in corresponding PCT Application No. PCT/US21/45167, dated Jan. 18, 2022 (18 pages).

*Primary Examiner* — Benjamin M Kurtz
(74) *Attorney, Agent, or Firm* — Locke Lord LLP

(57) ABSTRACT

A screening system for solid removal includes a housing and a screen positioned within the housing. A flow inlet is operatively connected to an interior chamber defined by the screen. A sump is downstream from the flow inlet for capturing solids that do not pass through the screen. A flow outlet is downstream from the screen in fluid communication with the flow inlet. A moveable cleaning assembly may be positioned either within a perimeter of the screen, around the perimeter of the screen or both. The moveable cleaning assembly is moveable with respect to the screen.

17 Claims, 10 Drawing Sheets

(51) Int. Cl.
*B01D 29/60* (2006.01)
*B01D 29/68* (2006.01)
*B01D 39/12* (2006.01)

(56) References Cited

U.S. PATENT DOCUMENTS

| | | | |
|---|---|---|---|
| 4,379,058 | A | 4/1983 | Bolton |
| 4,923,600 | A | 5/1990 | Krofta |
| 5,632,907 | A * | 5/1997 | Norbury .............. B01D 36/045 210/791 |
| 7,465,391 | B2 | 12/2008 | Heist et al. |
| 2005/0263448 | A1 | 12/2005 | Heist et al. |

* cited by examiner

SYSTEMS AND METHODS FOR SCREENING

CROSS-REFERENCE TO RELATED APPLICATIONS

This application claims the benefit of priority to U.S. Provisional Patent Application No. 63/063,201 filed Aug. 7, 2020, which is incorporated by reference herein in its entirety.

BACKGROUND OF THE INVENTION

1. Field of the Invention

The subject disclosure relates to screening systems, and more particularly to screening systems that separate floating and suspended solids from a flowing liquid, such as those in storm water drain systems, mixed sewage and storm water drain systems, and/or industrial waste systems.

2. Background of the Related Art

In general, screening systems for use in storm water drain systems, mixed sewage and storm water drain systems, and/or industrial waste systems act to remove solids, e.g. floating and suspended solids, from a fluid mixture. Continuous deflection screen systems channel a flow mixture into an interior portion of a screen where the mixture forms a circulating flow that sweeps the screen clean of solids captured from the fluid flow that concentrate inside of the screen. The settleable (e.g. heavier) solids settle into a lower chamber, often called a sump, while floatable solids are retained at the surface of an upper separation chamber. Filtrate (e.g. the liquid from the mixture) passes out of the screen and to an outlet that can then be discharged to a receiving body of water, or other disposal location. Solids that are accrued in the sump can be removed with an underflow pump. When the build-up of solids begins to interfere with the hydraulic operation and screen cleaning, it becomes necessary to clean them out. Typically, this cleaning done with mechanical cleaning (vactor trucks, clamshells, etc.) or with a sump pump.

Screening systems in storm water drain systems can assist in removing pollutants from storm water before the storm water drains to the receiving body of water. Screening systems in mixed sewage and storm water drain systems allow some of the excess fluid volume to be shed from the sewer prior to reaching a sewage plant, which in turn can make the sewage plant more efficient. This is particularly helpful during excess wet-weather events. Screening systems in industrial waste systems act to separate solid pollution from a liquid flow to reduce the overall volume of polluted liquid being discharged into sewers. Continuous deflection screen systems are described in more detail in U.S. Pat. No. 7,465,391, which is hereby incorporated by reference in its entirety.

Traditional screening systems have been considered satisfactory for their intended purpose. However, there is an ongoing need for screening systems that are more efficient and easier to use.

SUMMARY OF THE INVENTION

As will be discussed in greater detail below in the Detailed Description section of this disclosure, the present disclosure is directed to a screening system for solid removal. The screening system for solid removal includes a housing and a screen positioned within the housing. A flow inlet is operatively connected to an interior chamber defined by the screen. A sump is downstream from the flow inlet for capturing solids that do not pass through the screen. A flow outlet is downstream from the screen in fluid communication with the flow inlet. A moveable cleaning assembly may be positioned either within a perimeter of the screen, around the perimeter of the screen or both. The moveable cleaning assembly is moveable with respect to the screen.

In accordance with some embodiments, the moveable cleaning assembly includes a ring and a series of nozzles circumferentially disposed around the ring.

The screen extends from a top to a bottom. The nozzles can be angled in a direction toward the bottom of the screen.

In certain embodiments, the moveable cleaning assembly includes a downwardly extending member, which can include at least one nozzle. The downwardly extending member can be a center member positioned within the perimeter of the screen along a central longitudinal axis defined by the screen. The center member can be mounted for movement along the longitudinal axis. It is also contemplated that the downwardly extending member can be positioned around the outer perimeter of the screen. The downwardly extending member can be mounted for circumferential movement about the outer perimeter of the screen. In some embodiments, the at least one nozzle includes a nozzle positioned at a distal end of the downwardly extending member. In certain embodiments, the at least one nozzle includes a series of nozzles spaced apart along the length of the downwardly extending member. It is contemplated that the downwardly extending member can be one of a plurality of downwardly extending members spaced apart within the perimeter of the screen, around the perimeter of the screen or both.

In some embodiments, the inlet is operatively connected to a base portion positioned below a bottom of the screen to channel a fluid mixture into the interior chamber. The outlet can be operatively connected to a top of the housing to channel a screened fluid from an annulus between the screen and the housing out of the housing.

In accordance with another aspect, a screening system for solid removal includes a flow inlet, a frame having a screen body removably positioned therein, a sump downstream from the flow inlet for capturing solids that do not pass through the screen, and a flow outlet downstream from the screen in fluid communication with the flow inlet.

In accordance with yet another aspect, a screen body for use in a screening system includes a metal sheet and angled holes defined in the metal sheet. When viewing a given hole from a first side of the hole in a direction perpendicular to a surface of the metal sheet a view through the metal sheet is obstructed by a backside surface of the given hole.

In accordance with yet another aspect, a screen body for use in a screening system includes a metal sheet and angled holes defined in the metal sheet. The angle ($\alpha$) of each hole with respect to a surface of the metal sheet is a function of the sheet thickness (t) at the hole and the hole diameter (d), wherein $$\alpha \leq 90 - \sin^{-1}\frac{d}{t}.$$

In accordance with another aspect, a method of manufacturing a screen body for use in a screening system includes providing a metal sheet and cutting holes in the metal sheet at an angle with respect to a surface defined by the metal sheet and at an angle with respect to a direction perpendicular to the surface of the metal sheet to form a screen body. The holes can be cut such that when viewing a given hole from a first side of the hole in the direction perpendicular to the surface of the metal sheet a view through the metal sheet is obstructed by a backside surface of the given hole.

In accordance with another aspect, a method of manufacturing a screen body for use in a screening system includes providing a metal sheet and cutting holes in the metal sheet at an angle (a) with respect to a surface defined by the metal sheet. The angle ($\alpha$) with respect to the surface of the metal sheet can be a function of the sheet thickness (t) at the hole and the hole diameter (d), wherein $$\alpha \leq 90 - \sin^{-1}\frac{d}{t}.$$

The method can include electro-polishing the screen. Cutting holes can include using a water-jet and/or laser cutter.

In accordance with another aspect, a screening system for solids removal includes a variable volume flow inlet assembly and a screen positioned downstream from the variable volume flow inlet assembly. A sump is downstream from the variable flow inlet assembly for capturing solids that do not pass through the screen. A flow outlet is downstream from the screen in fluid communication with the variable volume flow inlet assembly.

In accordance with some embodiments, the variable volume flow inlet assembly includes an inlet conduit and a series of moveable steel shims having a triangular cross-section. The steel shims can be varying sizes.

In accordance with another aspect, a screening system for solid removal includes a housing and a screen positioned within the housing. A flow inlet is operatively connected to an interior chamber defined by the screen. A sump is positioned downstream from the flow inlet for capturing solids that do not pass through the screen. A flow outlet is positioned downstream from the screen. A weir positioned between the screen and the flow outlet.

In some embodiments, the system includes a housing outlet between the screen and the flow outlet. The weir can be movably mounted to the housing and configured to move with respect to the housing outlet. In some embodiments, the system includes a threshold section of the housing between the flow outlet and the housing outlet. The weir can be movably mounted to the threshold section of the housing and configured to move with respect to the threshold section of the housing. The flow outlet can be defined in the threshold section of the housing. It is contemplated that the flow outlet can be a floating debris outlet, and/or a filtrate outlet.

In accordance with another aspect, a screening system for solid removal includes a housing and a screen positioned within the housing. A flow inlet operatively connected to an interior chamber defined by the screen. A sump is positioned downstream from the flow inlet for capturing solids that do not pass through the screen. A sump drain is downstream from the sump. A sump valve and/or a sump pump is operatively connected to the sump drain to control the flow rate therethrough based on at least one characteristic of the waste in the system. A plurality of sensors are operatively connected to the at least one of the sump valve or the sump pump to sense the at least one characteristic of the waste.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those having ordinary skill in the art to which the present disclosure pertains will more readily understand how to employ the systems and methods of the present disclosure, embodiments thereof will be described in detail below with reference to the drawings, wherein.

These and other aspects of the subject disclosure will become more readily apparent to those having ordinary skill in the art from the following detailed description of the invention taken in conjunction with the drawings.

DETAILED DESCRIPTION OF PREFERRED EMBODIMENTS

Disclosed herein are detailed descriptions of specific embodiments of the screening systems and methods of the present disclosure. It will be understood that the disclosed embodiments are merely examples of the way in which certain aspects of the invention can be implemented and do not represent an exhaustive list of all of the ways the invention may be embodied. Indeed, it will be understood that the systems, devices and methods described herein may be embodied in various and alternative forms. Moreover, the figures are not necessarily to scale and some features may be exaggerated or minimized to show details of particular components. Well-known components, materials or methods are not necessarily described in great detail in order to avoid obscuring the present disclosure. Any specific structural and functional details disclosed herein are not to be interpreted as limiting, but merely as a basis for the claims and as a representative basis for teaching one skilled in the art to variously employ the invention.

Figure 1:
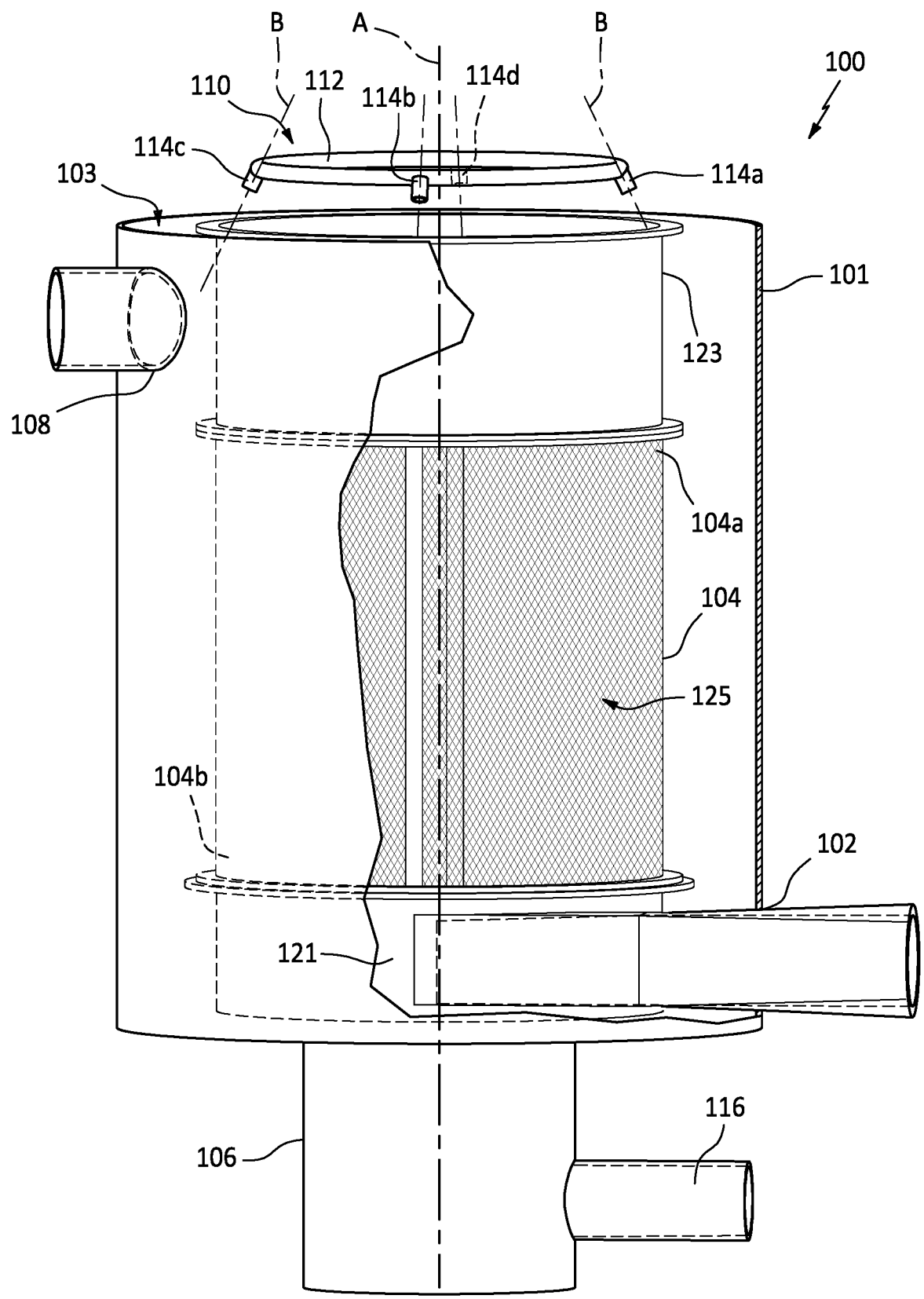
FIG. 1 is a schematic depiction of a cut-away partial cross-section of an embodiment of a screening system constructed in accordance with the present disclosure, showing an internal moveable wash-down ring in a raised position.
Figure 2:
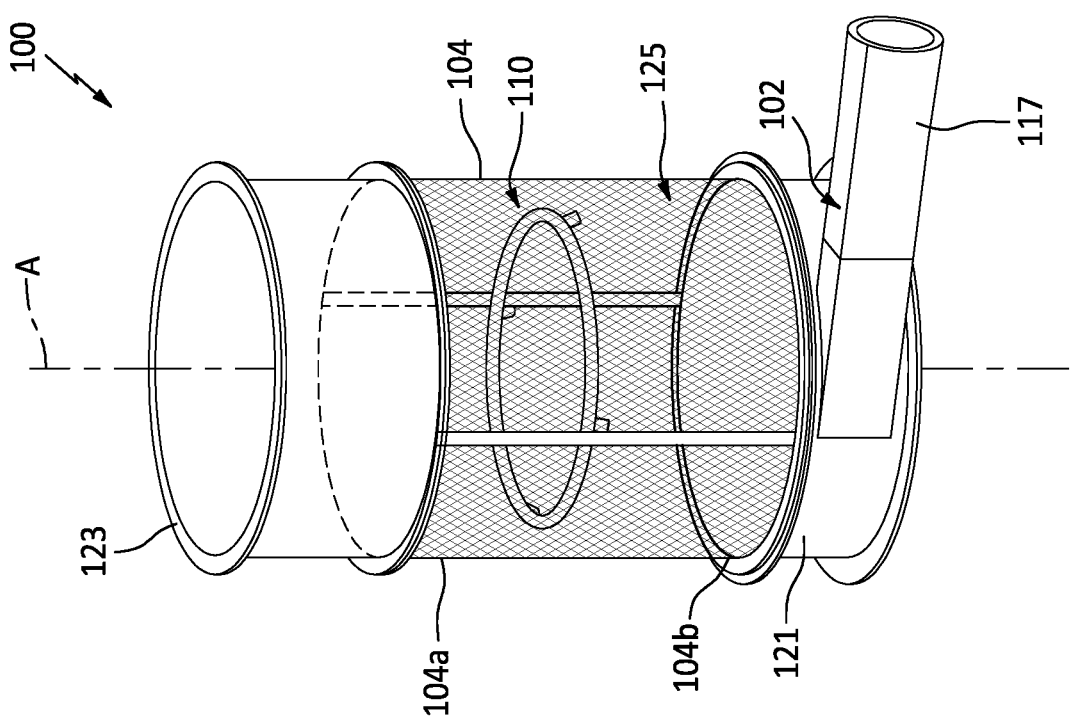
FIG. 2 is a schematic depiction of a portion of the screening system of FIG. 1, showing the housing removed and the moveable internal wash-down ring in a lowered position within the interior of the screen.

As shown in FIGS. 1-2, a screening system 100 for solid removal includes a housing 101 (shown translucently so that the inner components can be appreciated) and a flow inlet 102. Flow inlet 102 includes a conduit 117 that feeds into an interior chamber 125 defined, in part, by a screen 104. A fluid with entrained solids and/or particulates, e.g. a fluid mixture or a fluid flow, is channeled into the interior of screen 104 and circulates around the inner surface of screen 104. Flow inlet 102 is offset from a longitudinal axis A of screen 104 and directs flow in a substantially tangential direction with respect to screen 104 and a base portion 121. The substantially tangential direction of flow inlet 102 with respect to base portion 121 (described in more detail below) and screen 104 acts to establish a circular flow direction for the fluid mixture. This circular flow causes solids or particulate matter of a predetermined size entrained in the fluid mixture to be trapped and to circulate within the confines of interior chamber 125 of screen 104. The circular motion of the flowing liquid or gas within interior chamber 125 of screen 104 also results in the entrained solids or particulate matter generally not adhering to screen 104, but being entrained in the circular motion of the fluid. There is effectively a hydraulic head between inlet 102 and flow outlet 108. In this way, the establishment of a circular flow motion of the fluid with screen 104 enables screen 104 to act as a generally self-cleaning filter. Fluid from the flow is able to pass freely through openings in screen 104 and is thereby able to be discharged to an outlet means. Captured solids from the flow concentrate inside of screen 104 and/or fall down into a sump 106, described below.

With continued reference to FIGS. 1-2, fluid that flows through screen 104 travels upward through an annulus 103 between screen 104 and the housing 101 toward flow outlet 108. Flow outlet 108 is downstream from the screen 104 in fluid communication with flow inlet 102. Flow outlet 108 receives the screened filtrate fluid (e.g. liquid and some very small particulates) that is permitted to pass through screen 104. Housing 101 is depicted transparently so that the inner portion of the system 100 is visible. Screen 104 is positioned within housing 101 operatively connected to flow inlet/conduit 102/117. Screen 104 extends from a top 104a to a bottom 104b along a longitudinal axis A. Top 104a of screen is operatively connected to a header portion 123 and bottom 104b of screen 104 is operatively connected to base portion 121. Header portion 123 and base portion 121 define upper and lower portions of interior chamber 125, respectively. Header and base portions 123 and 121, respectively, are made from solid (non-permeable) material instead of a screen or other filter material. Header and base portions 123 and 121, respectively, can include, however, defined inlets/outlets formed by removing material. For example, base portion 121 includes an opening for inlet conduit 117 to connect to and channel fluid into interior 125. Similar inlets/outlets are contemplated for header portion 123.

With continued reference to FIGS. 1-2, sump 106 is downstream from flow inlet 102 below screen 104 for capturing solid debris or waste that do not pass from interior chamber 125 of screen 104 to the exterior of screen 104. A sump valve and/or a sump pump is operatively connected to sump drain 116 (e.g. an outlet 116) to control the flow rate therethrough based on at least one characteristic of the waste in system 100. The sump pump can be downstream from sump drain 116. A plurality of sensors (not shown) are operatively connected to the at least one of the sump valve or the sump pump to sense the at least one characteristic of the waste, such as the waste level in the screening chamber, the measured flow rate(s), solids level measured inside the sump, solids percentage or parts per million in the incoming filtrate flow, solids percentage in the previous sump drain cycle (used to determine how if sump 106 was emptied in time or too early), a comparison of one or more sensor inputs (such as solids level inside the sump 106 vs. solids percentage in the incoming filtrate flow).

With continued reference to FIGS. 1-2, a moveable cleaning assembly, shown as a movable wash-down ring 110, is positioned within a perimeter of the screen 104. The wash-down ring 110 is a separate component that is inserted into screen 104 (or outside of it, as described with external wash-down ring 210) for cleaning the screen by maintenance personnel or the like, but is removed from screen 104 during active filtration operation. Wash-down ring 110 is moveable with respect to screen 104. For example, as shown in FIG. 1, wash-down ring 110 is in a raised position. It is contemplated that ring 110 can pause at the raised position of FIG. 1, or toward the top of screen 104 generally, and use downward-pointing spray nozzles 114a-114d, described in more detail below, to wash screen 104. Or, ring 110 can drop all the way to the bottom of screen 104, or a position in between, like that shown in FIG. 2. In FIG. 2, wash-down ring 110 is in a lowered position, which, in some cases, may be able to better clean the screen 104.

As shown in FIG. 1, moveable wash-down ring 110 is an assembly that includes a ring 112 and a series of nozzles 114a-114d circumferentially spaced apart around ring 112. Each nozzle 114a-114d is angled along a respective nozzle axis B in a direction toward bottom 104b of screen 104. Nozzle axes B are shown for nozzles 114a and 114c, however it is contemplated that nozzles 114b and 114d would have similar respective nozzle axes that run along the longitudinal axis of the nozzle in the direction that the nozzle is pointing. Each nozzle 114a-114d can be in fluid communication with a fluid source, e.g. water, to supply a pressurized stream of cleaning fluid to the screen.

Figure 3:
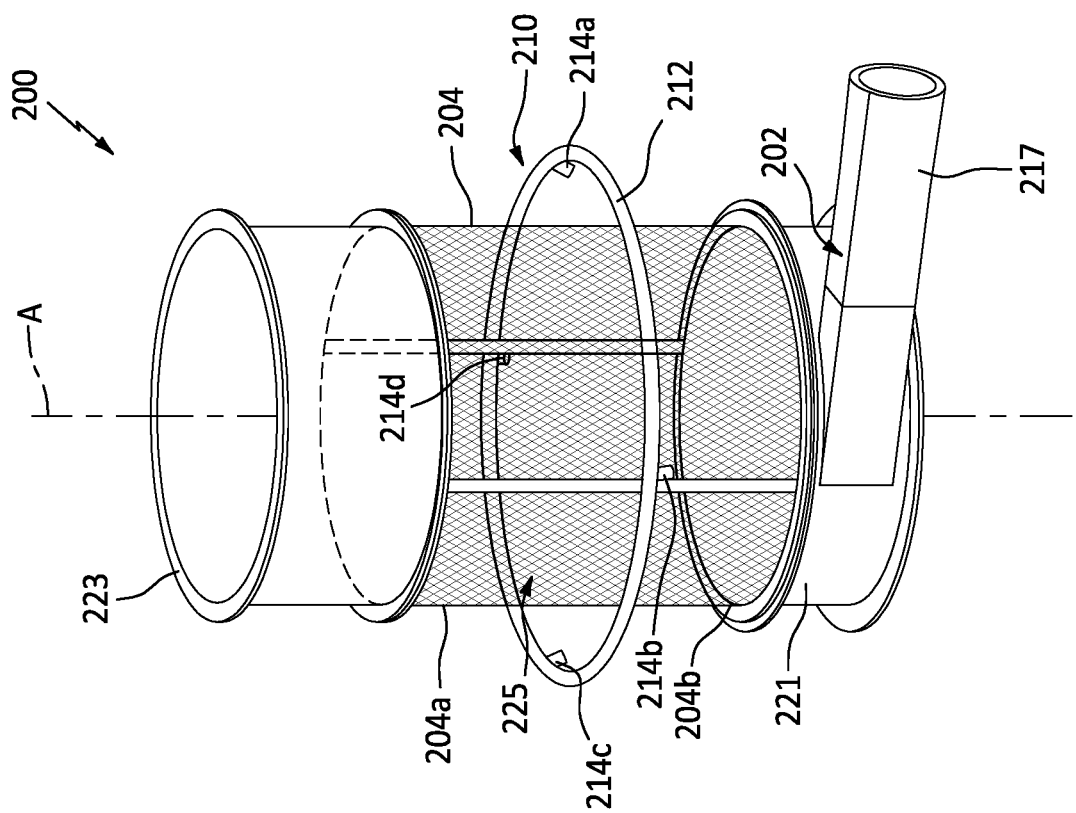
FIG. 3 is a schematic depiction of a portion of an embodiment of a screening system constructed in accordance with the present disclosure, showing the system with the housing removed and with an external moveable wash-down ring in a lowered position around the screen.

With reference now to FIG. 3, a screening system 200 includes a moveable cleaning assembly that is an external movable wash-down ring 210. System 200 is the same as screening system 100 except that instead of internal wash-down ring 110, external wash-down ring 210 is used. System 200 includes a housing similar to housing 101. Housing of system 200 is not shown in FIG. 3, in order to better show wash-down ring 210. System 200 includes a flow inlet 202 and a screen 204 operatively connected to the flow inlet 202 to receive a filtrate mixture therefrom into an interior chamber 225 of the screen 204. Flow inlet 202 is positioned toward a bottom 204b of screen 204 and includes a conduit 217. A sump (not shown) is downstream from the flow inlet 202 for capturing solids that do not pass through the screen 204, similar to sump 106. A flow outlet (not shown) is downstream from the screen 204 in fluid communication with the flow inlet 202 and would be similar to outlet 108. A top 204a of the screen 204 is operatively connected to a header portion 223 and a bottom 204b of screen 104 is operatively connected to a base portion 221, header and base portions 223 and 221, respectively, are similar to header and base portions 123 and 121, respectively, described above.

As shown in FIG. 3, external wash-down ring 210 in a lowered position. Those skilled in the art will readily appreciate that in a raised position, external wash-down ring 210 can be in a similar axial position as wash-down ring 110 is in a raised position (e.g. as shown in FIG. 1). External wash-down ring 210 is, in certain aspects, similar to wash-down ring 110 in that it includes a ring 212 and a series of nozzles 214a-214d circumferentially disposed around the ring 212. Each nozzle 214a-214d is angled along a respective nozzle axis in a direction toward bottom 204b of the screen 204.

In certain embodiments, the moveable cleaning assembly for system 100 and/or 200 can include a downwardly extending member instead of, or in addition to, an internal/external ring. The downwardly extending member can include at least one nozzle, similar to nozzles 114a-114d and 214a-214 described above, except that instead of being circumferentially arranged about a ring, the nozzles are linearly arranged. The downwardly extending member can be a drop down stalk within the perimeter of the screen that is movable along a central longitudinal axis, e.g. longitudinal axis A, defined by the screen. The stalk can rotate about longitudinal axis A (and/or its own longitudinal axis) or it can remain fixed with respect to rotation. There can be multiple stalks movable in a direction along longitudinal axis A that can be lowered and raised within the interior chamber of the screen. For example, they can be circumferentially spaced apart about the inner diameter of the screen. The multiple stalks can be fixed with respect to rotation, can rotate about longitudinal axis A, and/or can rotate about their own respective longitudinal axes.

It is also contemplated that the downwardly extending member can be positioned around the outer perimeter of the screen. For example, downwardly extending member can be a drop down stalk (e.g. a vertical bar) that goes around the outer perimeter of the screen, in the space between an outer perimeter of the screen, e.g. screen 104, and an inner perimeter of the housing, e.g. housing 101. This can rotate around longitudinal axis A, can rotate about its own respective longitudinal axis, and/or can be fixed with respect to rotation about either axis. This system can include multiple vertical bars circumferentially spaced apart around the outer perimeter of the screen, or spaced apart around the inner diameter of the screen. The vertical bars can rotate about longitudinal axis A, can rotate about their own respective longitudinal axes, and/or can be fixed with respect to rotation about either axis. A configuration with multiple drop down stalks/vertical bars, whether internal or external, may increase wash-down speed, but will likely require more fluid flow connected to the nozzles.

It is contemplated that the downwardly extending member (whether internal or external, single or multiple), can include a nozzle positioned at a distal end of the downwardly extending member, e.g. the end closest to the inlet 102 or 202. In some embodiments, the downwardly extending member can include a plurality of nozzles spaced apart along the length of the downwardly extending member, e.g. spaced apart in a direction parallel to longitudinal axis A.

Figure 4A:
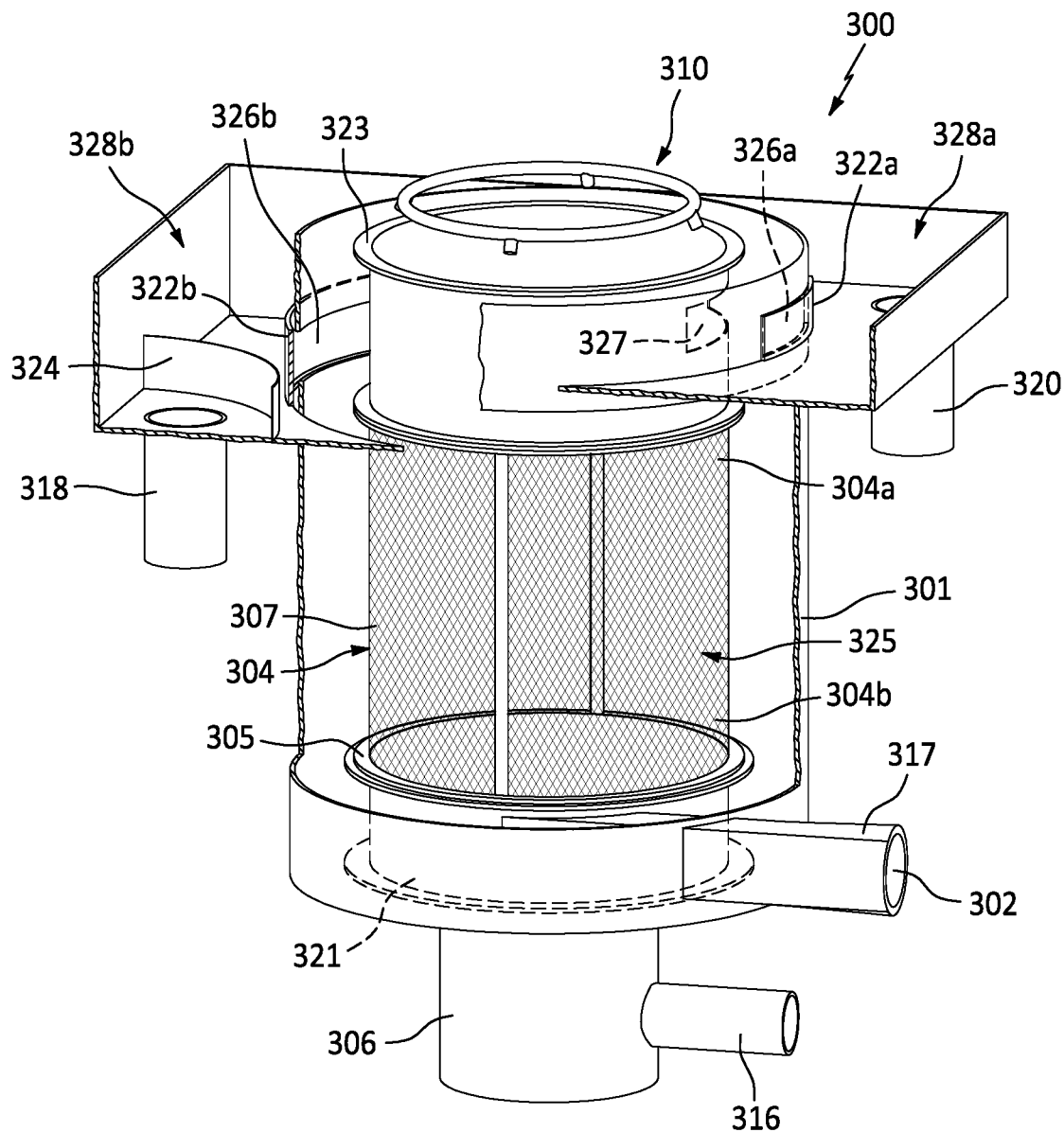
FIG. 4A is a schematic depiction of a cut-away partial cross-section of an embodiment of a screening system constructed in accordance with the present disclosure, showing the system having a filtrate outlet and a floatable debris outlet each including an associated weir structure.
Figure 4B:
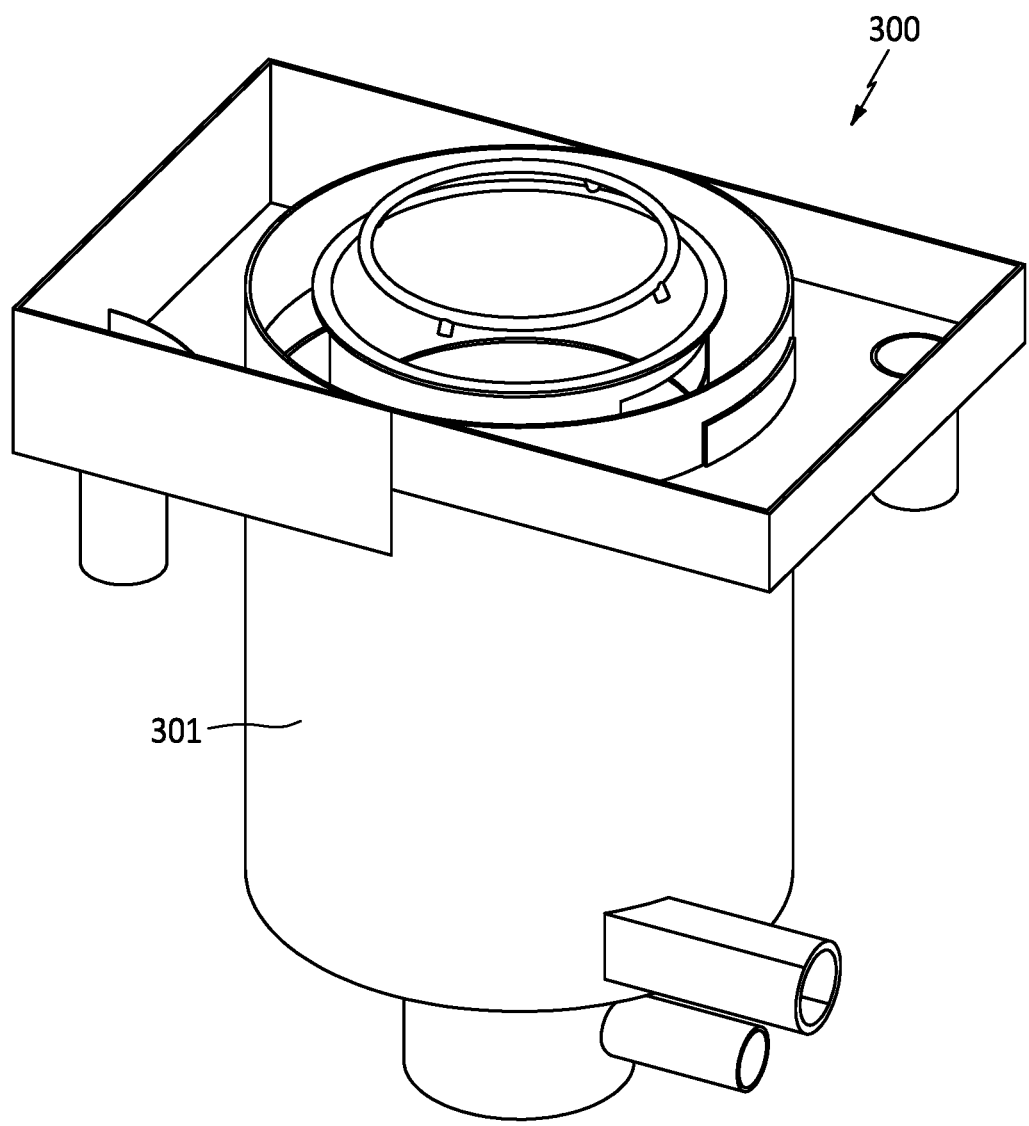
FIG. 4B is a schematic depiction of the screening system of FIG. 4A, showing the outside of the system housing.

As shown in FIG. 4A, a screening system 300 for solid removal includes a housing 301 (shown translucently so that the inner components can be appreciated) and a flow inlet 302 defined in a bottom portion of the housing 301. For sake of completeness, FIG. 4B shows the outer surface of housing 301. Flow inlet 302 includes a conduit 317. System 300 is similar to system 100 except that system 300 includes separate filtrate and floatable debris outlets, 318 and 320 respectively, that are included in its overall flow outlet. Housing 301 is depicted transparently so that the inner portion of the system 300 is visible. A screen 304 is positioned within housing 301 and is operatively connected to flow inlet 302 to receive a filtrate mixture for screening. Screen 304 forms a hollow cylinder that extends from a top 304a to a bottom 304b along a longitudinal axis A and defines an interior chamber 325 within its perimeter. Top 304a is proximate to filtrate and floatable debris outlets, 318 and 320, respectively, and the top of housing 301. Top 304a of screen is operatively connected to a header portion 323 and bottom 304b of screen 304 is operatively connected to base portion 321. Header and base portions 323 and 321, respectively, are similar to header and base portions 123 and 121, respectively, except that header portion 323 includes a header outlet 327, described in more detail below. Bottom 304b is proximate to inlet 302 and the bottom of the housing 301. Screen 304 includes a frame 305 that has a screen body 307 removably positioned therein. Specifically, screen body 307 can be slid in and out of frame 305. This allows for 'quick swap' screen changes by sliding screen body 307 into frame 305. Frame 305 includes bolts configured to close around the screen body 307 and hold it in place.

With continued reference to FIG. 4A, a sump 306 is downstream from the flow inlet 302, below screen 304 for capturing solids that do not pass through the screen 304. Sump 306 is operatively connected to a sump drain 316. System 300 is shown with a moveable cleaning assembly that is an internal wash-down ring 310, similar to the movable wash-down ring 110. However, it is also contemplated that an external movable wash-down ring, e.g. wash-down ring 210, can also be used in system 300, in conjunction with or in place of wash-down ring 310. It is also contemplated that a downwardly extending member (described above) can be used in conjunction with, or in place of, wash-down rings 110 or 210.

With continued reference to FIG. 4A, the flow outlet includes header outlet 327, housing outlets 326a and 326b.

Housing outlet 326b is associated with a filtrate outlet 318. Header outlet 327 and housing outlet 326a are associated with a floatable debris outlet 320. Filtrate outlet 318 and floatable debris outlet 320 are shown as conduits extending from respective threshold sections. System 300 includes first and second threshold sections 328a and 328b, respectively, of the housing 301. First threshold section 328a is between the housing outlet 326a and the floatable debris outlet 320 and is in fluid communication with interior chamber 325 via header outlet 327. Second threshold section 328b is between the filtrate outlet 318 and housing outlets 326b. Movable weir 322a and 322b are positioned at their respective housing outlets 326a and 326b.

Figure 5A:
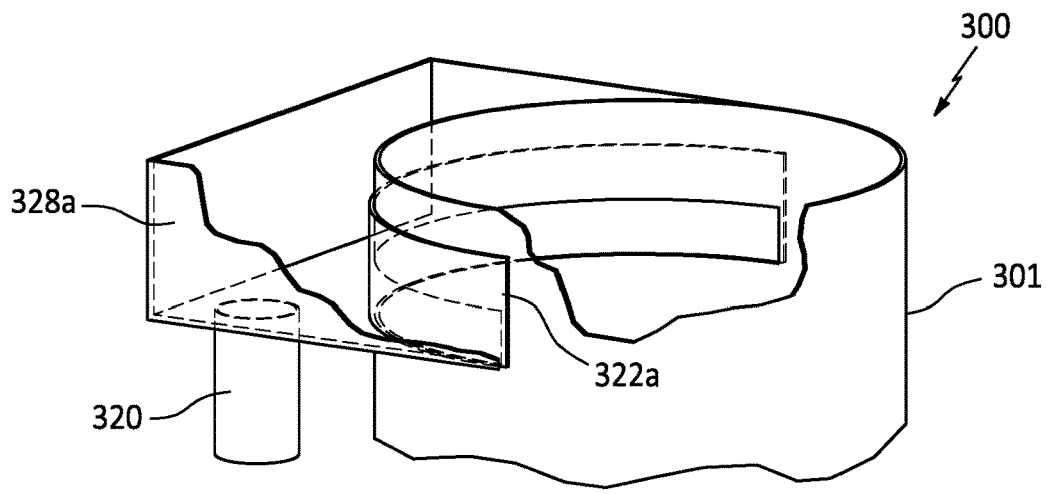
FIG. 5A is a schematic depiction of a cut-away of a portion of an embodiment of a screening system constructed in accordance with the present disclosure, showing a floatable debris outlet of the system having its weir raised.
Figure 5B:
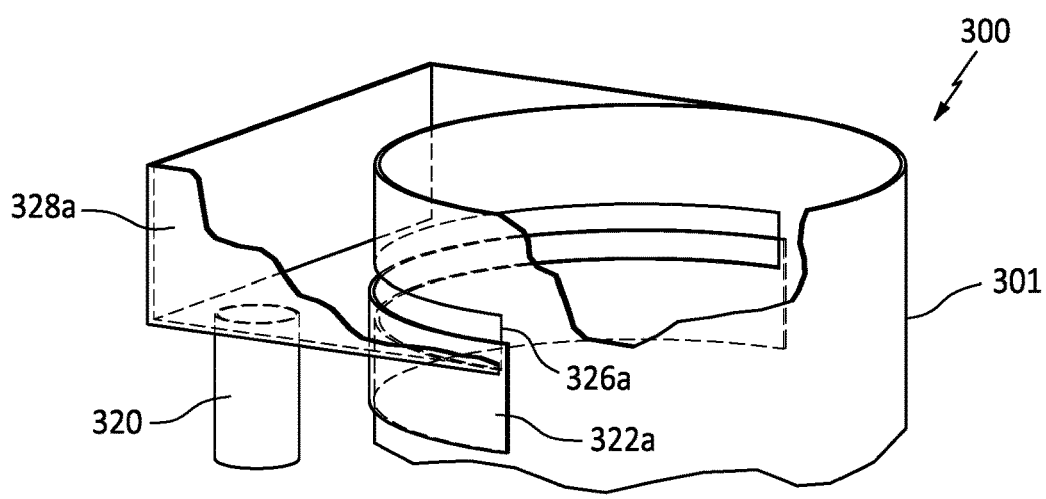
FIG. 5B is a schematic depiction of the system of FIG. 5A, showing the floatable debris outlet of the system having its weir partially lowered.
Figure 5C:
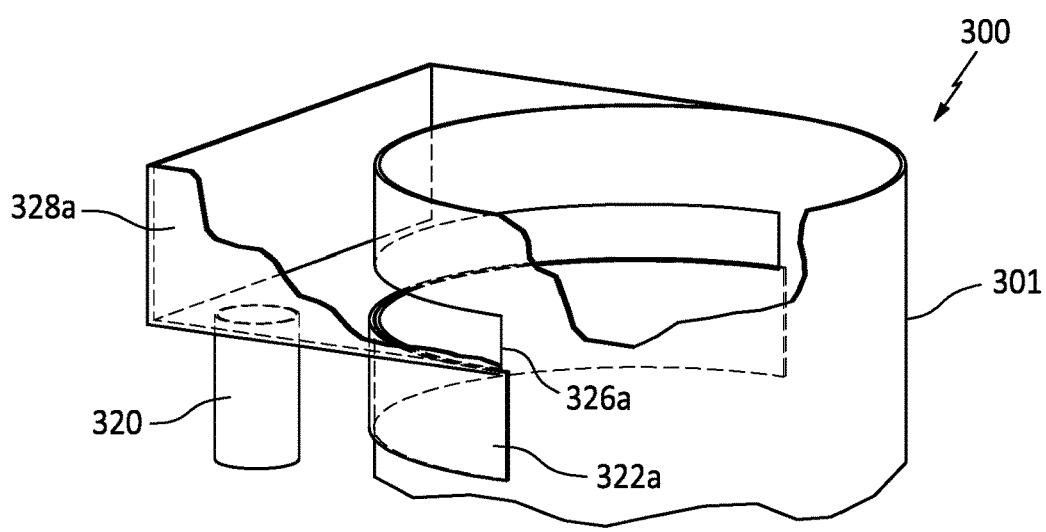
FIG. 5C is a schematic depiction of the system of FIG. 5A, showing the floatable debris outlet of the system having its weir fully lowered.
Figure 8:
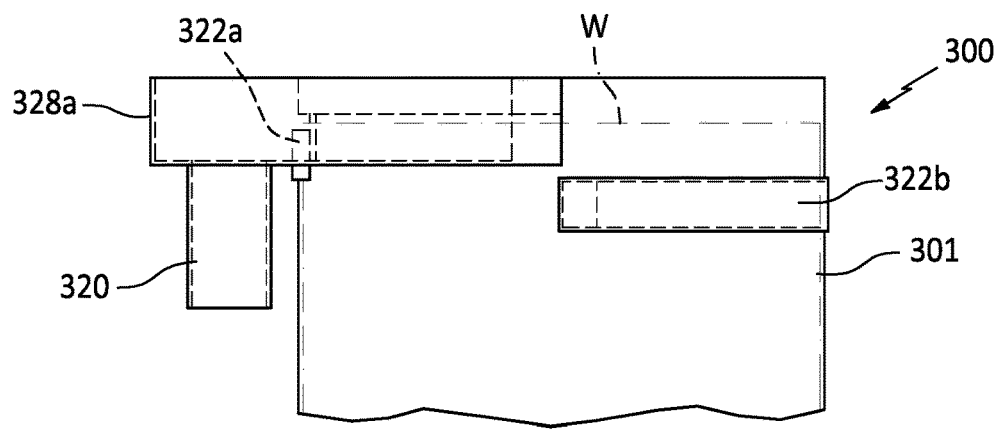
FIG. 8 is a schematic depiction of a portion of an embodiment of a screening system constructed in accordance with the present disclosure, showing a filtrate outlet of the system and a floatable debris outlet of the system, where the weir associated with the floatable debris outlet is partially lowered.

With reference now to FIGS. 4A, 5A-5B and 8, movable weir 322a is positioned between screen 304 and floatable debris outlet 320. Weir 322a-322b are movably mounted to housing 301 and configured to move with respect housing 301 to occlude or unocclude their respective outlets 326a-326b. For example, FIGS. 5A-5C are schematic depictions of system 300 from the other side of system 301, as compared with FIG. 4A. FIGS. 5A-5B do not show housing 328b and filtrate outlet 318. FIG. 5A shows weir 322a in a raised position with respect to housing and outlet 326a. FIG. 5B shows weir 322a in a partially lowered position with respect to housing 301 and outlet 326a. FIG. 5C shows weir 322a in a lowered position with respect to housing 301 and outlet 326a. FIG. 8 depicts system 300 with fluid slightly over the top of weir 322a with weir 322a partially lowered. This allows floating debris to drain off the top and through floating debris outlet 320.

Figure 6:
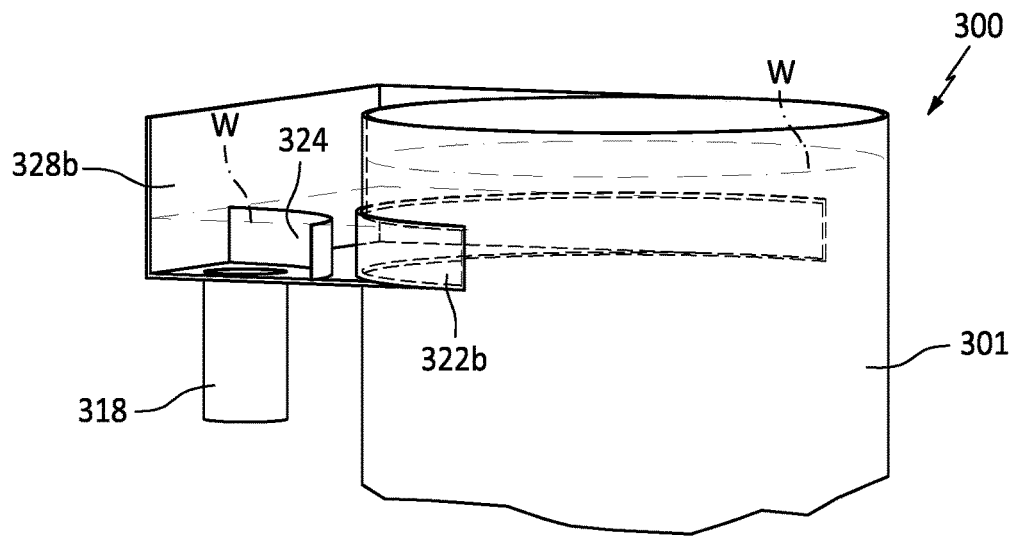
FIG. 6 is a schematic depiction of a partial cross-section of a portion of an embodiment of a screening system constructed in accordance with the present disclosure, showing a filtrate outlet of the system and its associated overflow and underflow weir structure.
Figure 7:
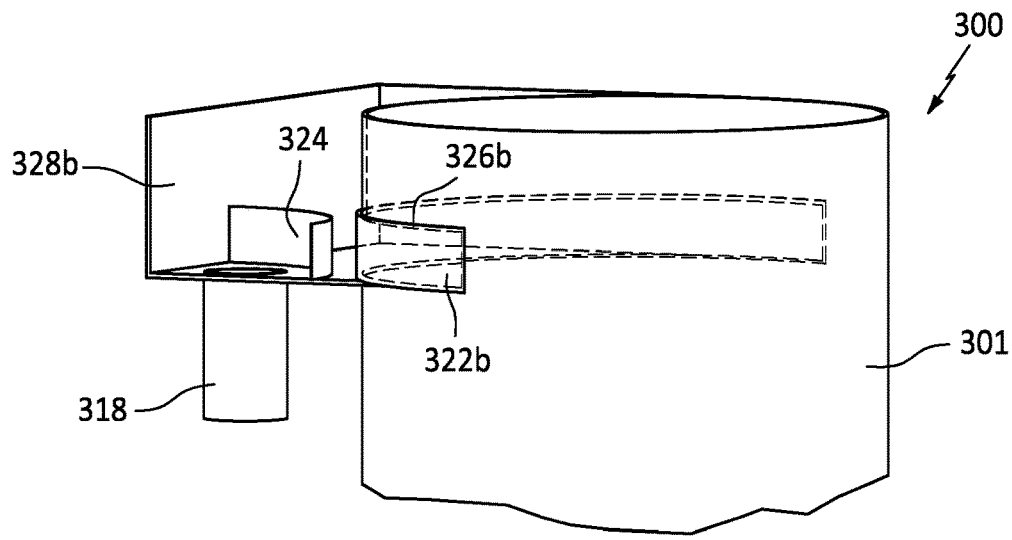
FIG. 7 is a schematic depiction of a partial cross-section of the embodiment of FIG. 6 with the fluid removed for clarity.

As shown in FIGS. 4A, 6 and 7, movable weir 322b is positioned between the screen 304 and the filtrate outlet 318. A weir 324 may be fixed or movably mounted to second threshold section 328b of the housing 301 and configured to move with respect to second threshold section 328b of housing 301. Weir 324 is positioned between the moveable weir 322b of the housing outlet 326b and the filtrate outlet 318. Filtrate outlet 318 is operatively connected to second threshold section 328b of the housing 301. Weir 324 is considered an overflow weir and weir 322b is considered an underflow weir. Underflow weir 322b and overflow weir 324 act to prevent loss of lighter than water solids, as well as loss of similar density or heavier than water solids. The water level W inside housing 301 must be higher than the level of the underflow weir 322b for the underflow weir to be opened and used, e.g. similar to the water level W as shown in FIG. 6.

One or more of weirs 322a-322b and 324 may be adjustable, either manually or via automated systems. It is contemplated that weirs 322a-322b and 324 may be raised or lowered to maintain continuous evacuation of floatable debris from the top of the water level inside the filter system, either inside the screen, outside the screen, or some combination thereof. The weirs may be periodically raised or lowered and then returned to a closed position, e.g. where the housing outlets 326a and 326b are blocked, to periodically evacuate trapped floatables from the filter system. The weirs 322a, 322b and 324 can be raised or lowered, opening a hole for the trapped solids in either or both chambers to be released into a separate path from the main flow. Movable weirs 322a-322b and 324 may lower periodically to operator-chosen set point, completely lower periodically, or partially lower via either operator-chosen set point or using sensors to determine water level and appropriate partially lowered position. This creates a mechanism to ensure floating waste is trapped in the top of the screening chamber, and heavier-than-water waste has one last chance to be trapped in the screening system before being drained to an external body of water. Debris that is either heavier or lighter than water can therefore be trapped in the system and removed instead of being drained to an external body of water.

Figure 10:
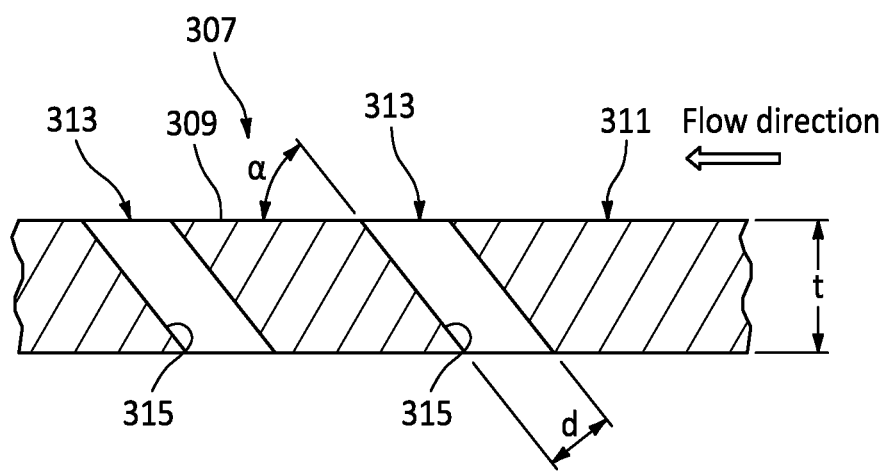
FIG. 10 is a schematic depiction of an embodiment of a cross-section of a portion of a screen body constructed in accordance with the present disclosure, showing the angled holes of the screen body.

With continued reference to FIGS. 4A-4B and 10, a screen body 307 can be used in screens 104, 204, or 304. For example, it can be curved to form the hollow cylinder described above, where fluid would flow from an interior chamber, e.g. interior chamber 325, to an annular portion, e.g. annulus 103, between screen 304 and housing 301. Screen body 307 includes a metal sheet 311 and angled holes 313 defined in metal sheet 311. The holes 313 are angled in a direction away from the flow direction within the interior chamber, shown schematically with an arrow, such that, when viewing a given hole from a first side of the hole in a direction perpendicular to the plane of the metal sheet, a view through metal sheet 311 is obstructed by a backside surface 315 of the given hole. For a hole with a constant diameter (d), this means that the angle (α) of a given hole with respect to a surface 309 of metal sheet 311 is a function of the sheet thickness (t) at the hole and the hole diameter (d). This is represented as:

$$\alpha \le 90 - \sin^{-1}\frac{d}{t}$$

Generally, angled holes 313 prevent material from passing directly through, which reduces the likelihood of debris from getting to the outlet. The oblique angle also reduces the likelihood of debris that may be stringy or similar in size to the hole from being caught and occluding the hole. Electro-polishing the screen, as described below, may enhance these characteristics.

A method of manufacturing a screen body, e.g. screen body 307, for use in a screening system includes providing a metal sheet, e.g. metal sheet 311, and cutting holes, e.g. holes 313, in the metal sheet at an angle (α) with respect to a surface, e.g. surface 309, of the metal sheet and at an angle with respect to a direction perpendicular to the metal sheet to form the screen body. The holes are cut such that when viewing a given hole from a first side of the hole in the direction perpendicular to the plane of the metal sheet a view through the metal sheet is obstructed by a backside surface, e.g. surface 315, of the given hole, such that light is prevented from passing through when viewed perpendicular to the screen. For a hole with a constant diameter (d), this means that angle (α) can be calculated as shown by the equation above. It is contemplated that the holes can be cut using a water-jet and/or laser cutter. Water-jet or laser-cut holes punched through a metal sheet or thin plate at an angle, as described above, can create 0.2-1.5 mm holes. The screen body can be bent into a cylindrical shape to fit into a frame, e.g. frame 305, to form a screen, e.g. screen 304.

The method can include electro-polishing the screen. Laser-cut holes and electro polishing result in a rippled surface effect on a micrometer scale. The angle of the holes, as described above, combined with the surface erosion that takes place during electro polishing, result in a screen that, when viewed from an angle perpendicular to the screen, will show what appears to be a solid, although rippled surface.

Figure 9:
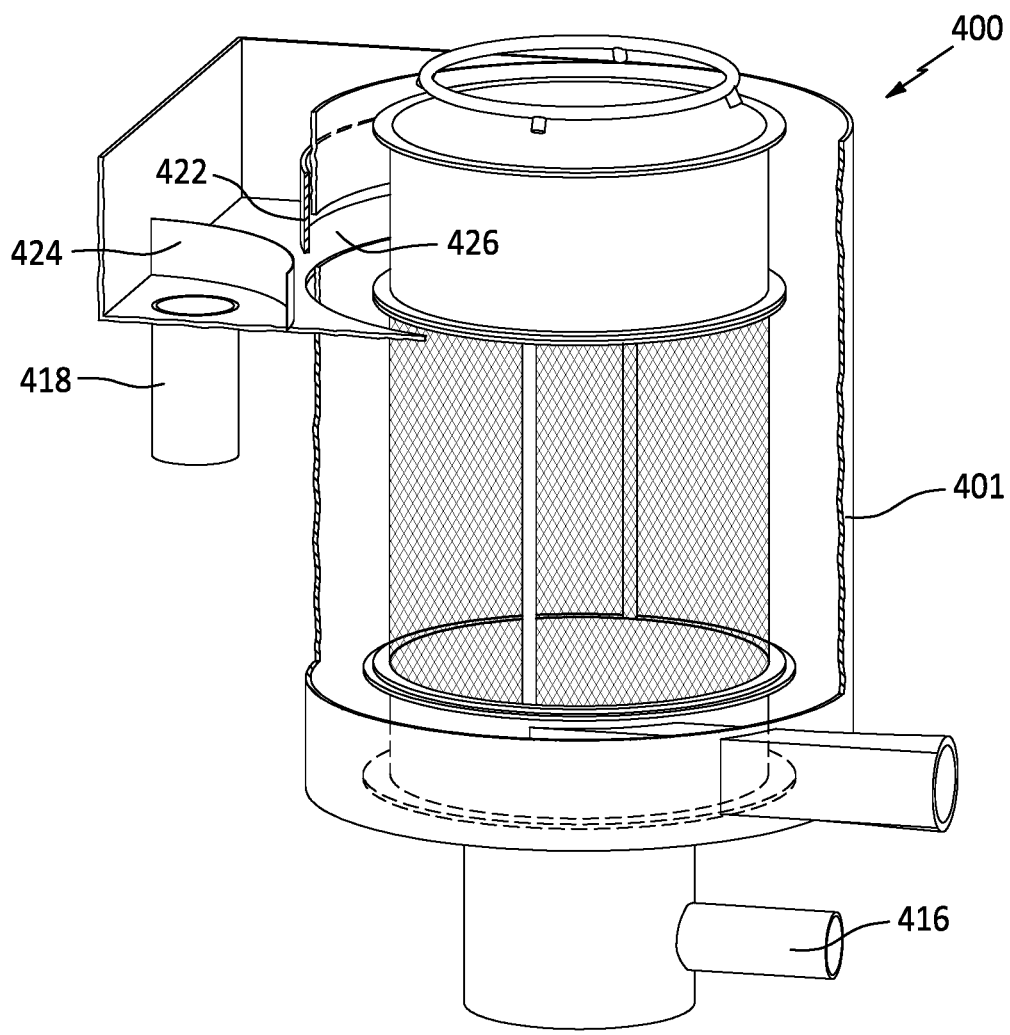
FIG. 9 is a schematic depiction of a cut-away partial cross-section of an embodiment of a screening system constructed in accordance with the present disclosure, showing a system without a floatable debris outlet.

As shown in FIG. 9, a screening system 400 is shown. System 400 is the same as system 300 except that instead of having a floatable debris outlet and a filtrate outlet, e.g. 320 and 318, respectively, there is only a single filtrate outlet 418 downstream from a housing outlet 426. System 400 includes an underflow weir 422 combination similar to underflow weir 322b and overflow weir 424 similar to overflow weir 324 to prevent loss of solids through the filtrate outlet. In system 400, it is contemplated that a secondary drain or flush system may assist cleanout of solids caught between the two weirs, either back into the main filter system to exit via the sump drain 416, or to immediately exit the system separately from the filtrate.

Figure 11:
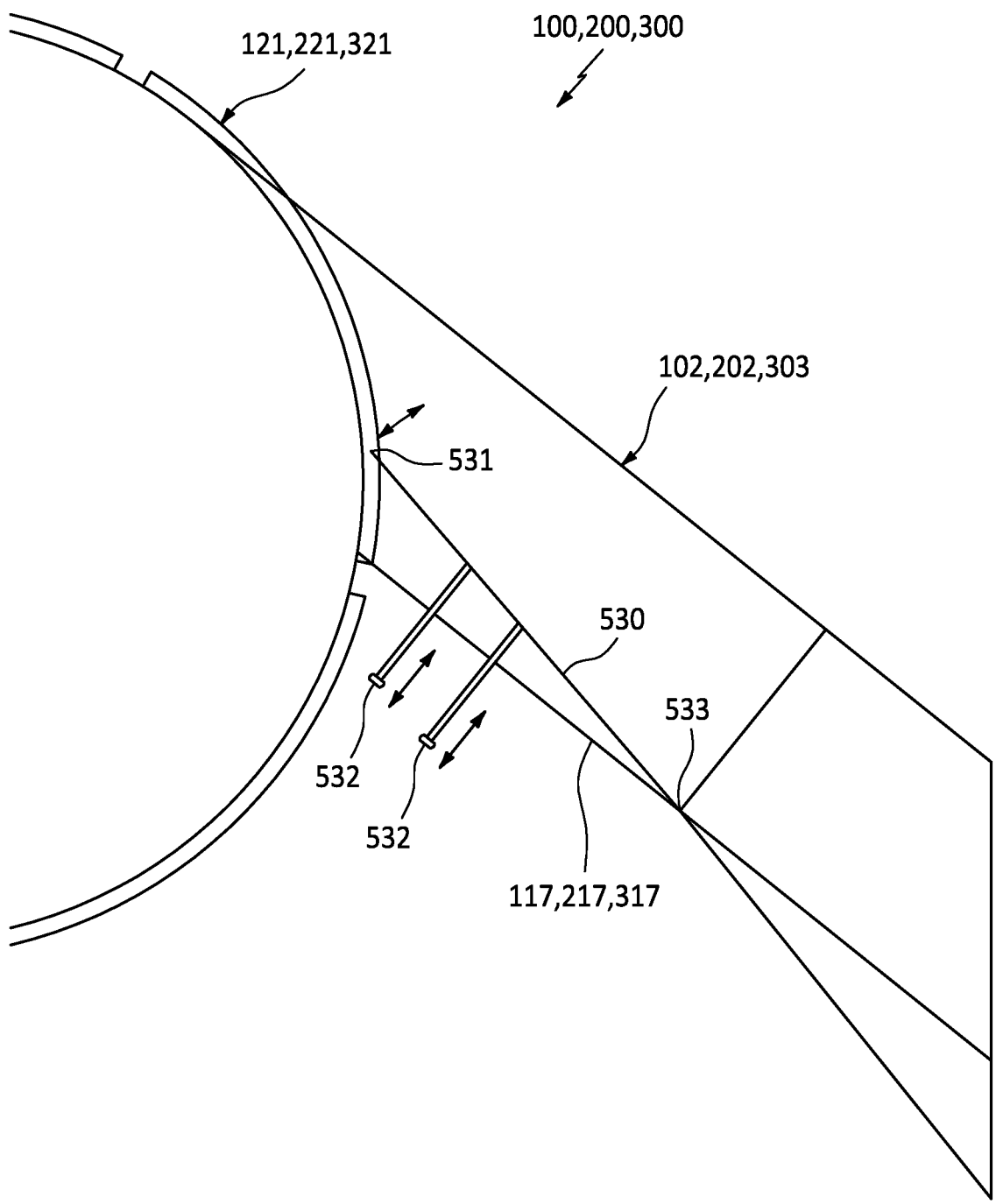
FIG. 11 is a schematic top-view depiction of an embodiment of a variable volume flow inlet assembly constructed in accordance with the present disclosure for use in the systems of FIGS. 1, 3 and/or 4A.
Figure 12:
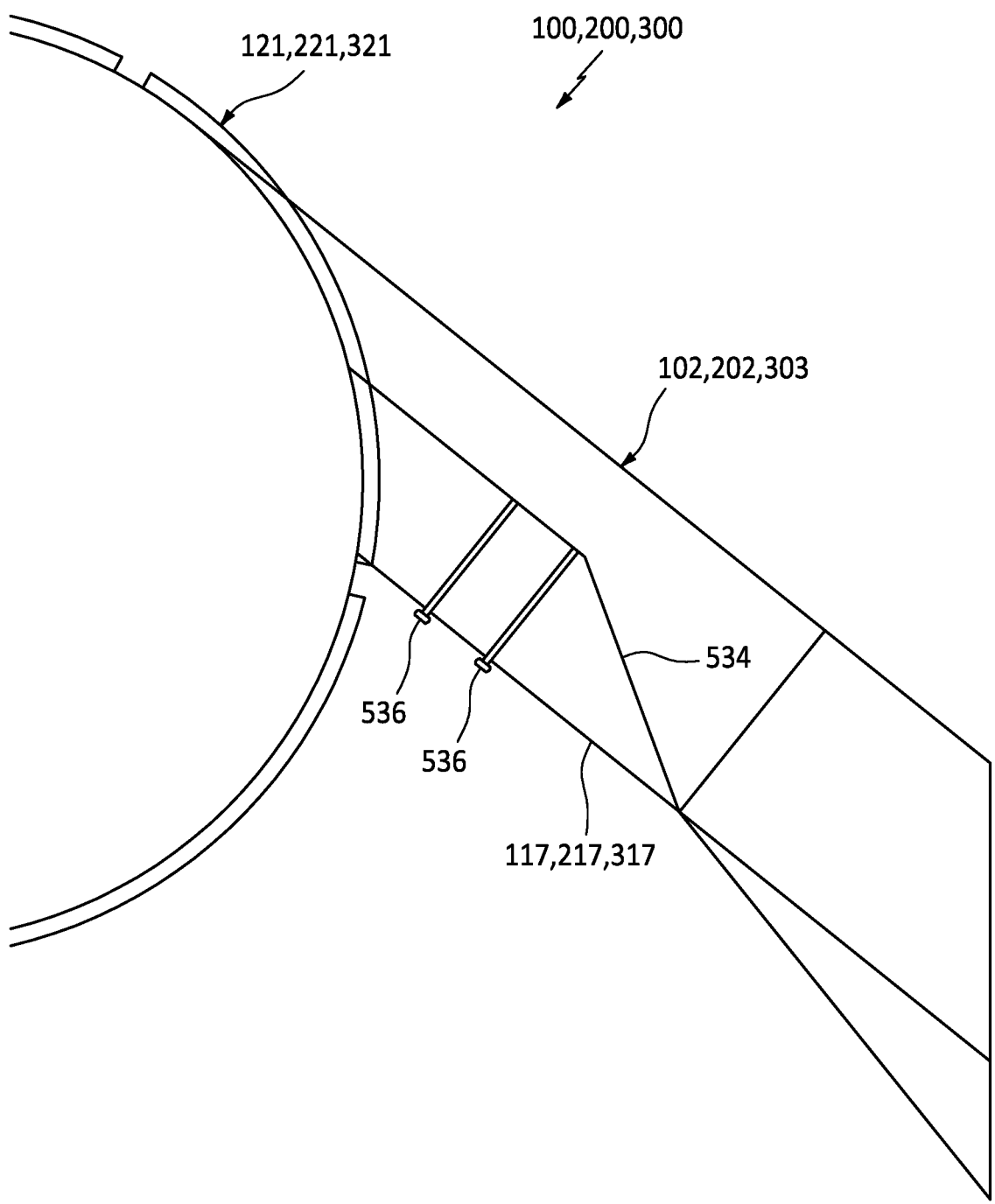
FIG. 12 is a schematic top-view depiction of another embodiment of a variable volume flow inlet assembly constructed in accordance with the present disclosure for use in the systems of FIGS. 1, 3 and/or 4A.
Figure 13:
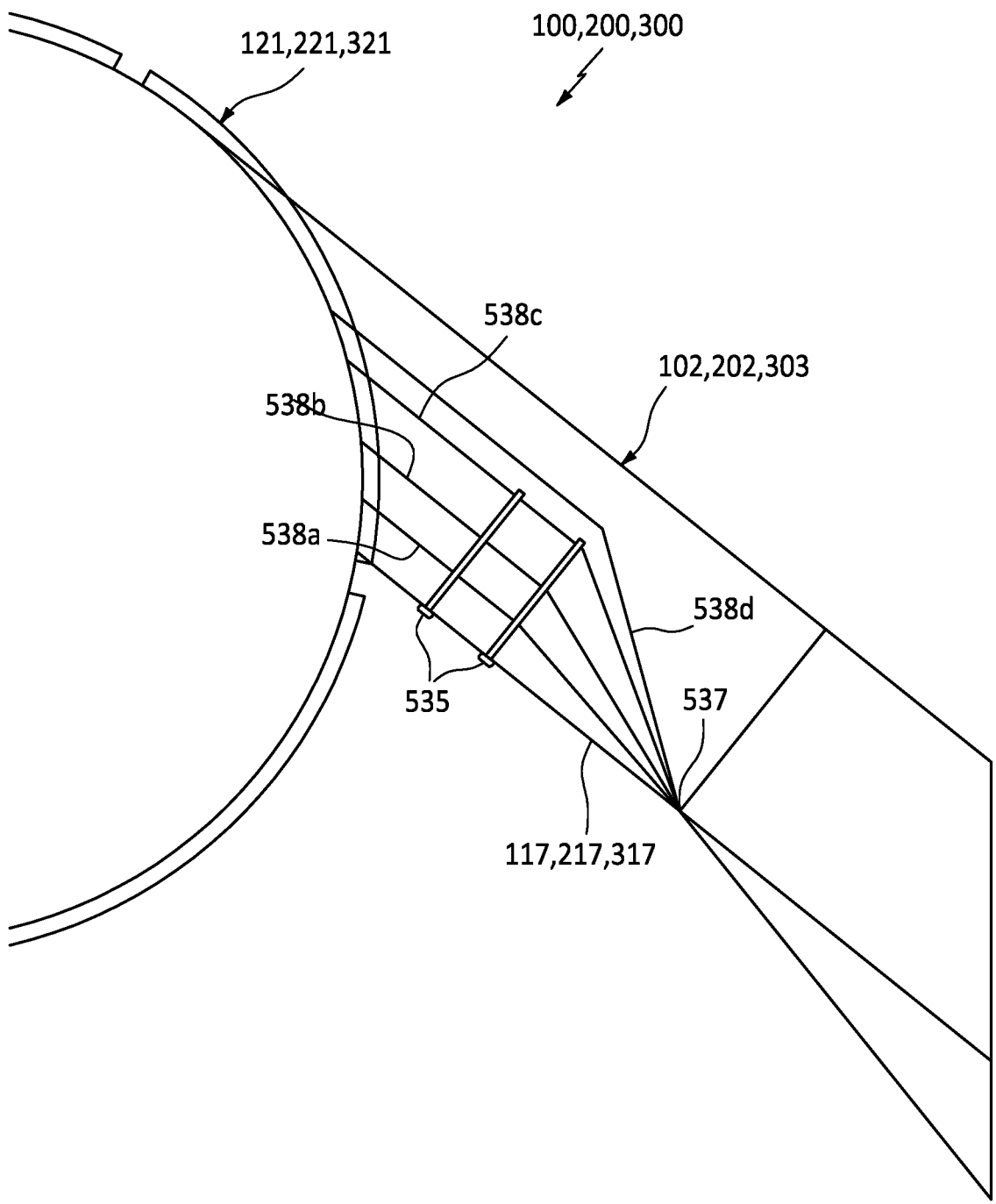
FIG. 13 is a schematic top-view depiction of another embodiment of a variable volume inlet assembly constructed in accordance with the present disclosure for use in the systems of FIGS. 1, 3 and/or 4A.

As shown in FIGS. 11-13, a screening system for solid removal, similar to systems 100, 200 and 300, includes a variable volume flow inlet assembly. This assembly can include a conduit 117/217/317 such as those provided for inlets 102, 202 and 302, and a series of moveable steel shims that when used in conjunction with the inlet housing form generally v-shape or wedge shape. The shims can be positioned within the conduits of inlets 102, 202 or 302 and can be varying sizes.

As shown in FIG. 11, a shim 530 can be made from a relatively thin steel sheet of steel or other metal and can be welded, hinged, bolted, or otherwise affixed at one end 533 to the inside of an inlet conduit 117/217/317. In FIG. 11, shim 530 can be rotated about end 533 and/or flexed by moving adjustment screws 532 (as indicated schematically by the double headed arrows) such that, as adjustment screws are moved back and forth, a tip 531 of shim 530 is moved inward/outward (as shown schematically by the double headed arrow proximate to the tip 531) increasing or decreasing the inlet size and also narrowing or widening the flow path through the inlet conduit 117/217/317. A narrower inlet conduit will create a higher velocity for the same flow rate, potentially improving the self-cleaning aspect of the screen. A wider inlet will lower the velocity but allow more flow through the system, potentially increasing system capacity and reducing head pressure loss. Flow through the inlet will keep the shim/plate in contact with the adjustment screws 532. The flow path through inlet conduit 117/217/317 can be adjusted to determine a required minimum velocity for the system to function for a given wastewater stream.

Shims can be flexed and/or rotated inwards via adjustment screws, as described above, or other methods of increasing the 'choke.' Decreasing the inlet size will allow various flow velocities on a single system 100/200/300. On a permanent installation, as shown in FIG. 12, a shim 534 can be thicker, e.g. too thick to flex, and can be positioned to achieve a set velocity at a given flow rate. In this case, screws 536 are used to secure the shim 534.

As shown in FIG. 13, stacked shims 538a-538d of various sizes can all be removeably affixed to the inside of inlet conduit 117/217/317 at one end 537 to allow flow velocities to be modified in permanent installations by unscrewing screws 535 and removing/adding one or more of stacked shims 538a-538d as needed. Those skilled in the art would readily appreciate that instead of shims 534 and 538a-538d, described above for FIGS. 12 and 13, a block(s) of material, box(ex), or the like can be used.

While the screening systems and methods of the subject invention have been shown and described with reference to preferred embodiments, those skilled in the art will readily appreciate that various changes and/or modifications may be made thereto without departing from the spirit and scope of the subject invention as defined by the appended claims. For example, portions of systems 100, 200 and 300 can be used interchangeably across systems 100, 200 and 300. It is believed that the present disclosure includes many other embodiments that may not be herein described in detail, but would nonetheless be appreciated by those skilled in the art from the disclosures made. Accordingly, this disclosure should not be read as being limited only to the foregoing examples or only to the designated embodiments.

What is claimed is:

1. A screening system for solid removal comprising:
a floatable debris outlet;
a filtrate outlet;
a housing having a first housing outlet associated with the floatable debris outlet, and a second housing outlet associated with the filtrate outlet;
a screen positioned within the housing;
a flow inlet operatively connected to an interior chamber defined by the screen;
a sump downstream from the flow inlet for capturing solids that do not pass through the screen;
a header portion operatively connected to a top of the screen, the header portion comprising a header outlet in fluid communication with the first housing outlet, wherein the first housing outlet is downstream of the header outlet, wherein the flow inlet is in fluid communication with the floatable debris outlet through the header outlet and the first housing outlet, wherein the flow inlet is in fluid communication with the filtrate outlet through the screen and the second housing outlet; and
a moveable cleaning assembly positioned either within a perimeter of the screen, around the perimeter of the screen or both, wherein the moveable cleaning assembly is moveable with respect to the screen.

2. The screening system as recited in claim 1, wherein the moveable cleaning assembly includes a ring and a series of nozzles circumferentially disposed around the ring.

3. The screening system as recited in claim 1, wherein screen extends from a top to a bottom, wherein the nozzles are angled in a direction toward the bottom of the screen.

4. The screening system as recited in claim 1, wherein moveable cleaning assembly includes a downwardly extending member, wherein the downwardly extending member includes at least one nozzle.

5. The screening system as recited in claim 4, wherein the downwardly extending member is a center member positioned within the perimeter of the screen along a central longitudinal axis defined by the screen.

6. The screening system as recited in claim 5, wherein the center member is mounted for movement along the longitudinal axis.

7. The screening system as recited in claim 4, wherein the downwardly extending member is positioned around the outer perimeter of the screen.

8. The screening system as recited in claim 7, wherein the downwardly extending member is mounted for circumferential movement about the outer perimeter of the screen.

9. The screening system as recited in claim 4, wherein the at least one nozzle includes a nozzle positioned at a distal end of the downwardly extending member.

10. The screening system as recited in claim 4, wherein the at least one nozzle includes a series of nozzles spaced apart along the length of the downwardly extending member.

11. The screening system as recited in claim 4, wherein the downwardly extending member is one of a plurality of downwardly extending members spaced apart within the perimeter of the screen, around the perimeter of the screen or both.

12. The screening system as recited in claim 1, wherein the inlet is operatively connected to a base portion positioned below a bottom of the screen to channel a fluid mixture into the interior of the screen.

13. The screening system as recited in claim 1, wherein the outlet is operatively connected to a top of the housing to channel a screened fluid from an annulus between the screen and the housing out of the housing.

14. The screening system of claim 1, wherein the housing includes a first threshold section and second threshold section.

15. The screening system of claim 14, wherein the first threshold section is between the first housing outlet and the floatable debris outlet and is in fluid communication with the interior chamber via the header outlet.

16. The screening system of claim 15, wherein the second threshold section is between the filtrate outlet and the second housing outlets.

17. The screening system of claim 16, further comprising an overflow weir mounted to the second threshold section of the housing, wherein the overflow weir is positioned between the second housing outlet and the filtrate outlet.

\* \* \* \* \*